US008677160B2

(12) United States Patent
Brey et al.

(10) Patent No.: US 8,677,160 B2
(45) Date of Patent: *Mar. 18, 2014

(54) MANAGING POWER CONSUMPTION OF A COMPUTER

(75) Inventors: Thomas M. Brey, Cary, NC (US); Wesley M. Felter, Austin, TX (US); Sumeet Kochar, Apex, NC (US); Charles R. Lefurgy, Austin, TX (US); Ryuji Orita, Redmond, WA (US); Freeman L. Rawson, III, Austin, TX (US); Malcolm S. Ware, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/546,090

(22) Filed: Jul. 11, 2012

(65) Prior Publication Data

US 2012/0284540 A1 Nov. 8, 2012

Related U.S. Application Data

(63) Continuation of application No. 12/146,056, filed on Jun. 25, 2008, now Pat. No. 8,307,220.

(51) Int. Cl.
*G06F 1/32* (2006.01)

(52) U.S. Cl.
USPC ........... 713/300; 713/310; 713/320; 713/321; 713/322; 713/323; 713/324; 713/330; 713/340

(58) Field of Classification Search
USPC ................... 713/300, 310, 320–324, 330, 340
See application file for complete search history.

(56) References Cited

U.S. PATENT DOCUMENTS

| 5,630,148 | A | 5/1997 | Norris |
| 7,155,621 | B2 | 12/2006 | Dai |
| 7,155,623 | B2 | 12/2006 | Lefurgy et al. |
| 7,219,241 | B2 | 5/2007 | Cooper et al. |
| 7,607,030 | B2 | 10/2009 | Goodrum et al. |
| 7,908,493 | B2 | 3/2011 | Bieswanger et al. |
| 2002/0087896 | A1 | 7/2002 | Cline et al. |
| 2005/0015632 | A1 | 1/2005 | Chheda et al. |
| 2005/0262365 | A1 | 11/2005 | Lint et al. |
| 2006/0129852 | A1 | 6/2006 | Bonola et al. |
| 2007/0162776 | A1 | 7/2007 | Carpenter et al. |
| 2007/0232254 | A1 | 10/2007 | Mackey et al. |
| 2008/0082840 | A1 | 4/2008 | Kendall et al. |
| 2008/0307238 | A1 | 12/2008 | Bieswanger et al. |
| 2009/0327764 | A1 | 12/2009 | Brey et al. |
| 2010/0325450 | A1 | 12/2010 | Kendall et al. |
| 2011/0035611 | A1 | 2/2011 | Brey et al. |

OTHER PUBLICATIONS

Office Action, U.S. Appl. No. 12/146,056, Aug. 5, 2011.
Final Office Action, U.S. Appl. No. 12/146,056, Jan. 19, 2012.
Office Action, U.S. Appl. No. 12/146,056, Mar. 26, 2012.
Notice of Allowance, U.S. Appl. No. 12/146,056, Jun. 28, 2012.

*Primary Examiner* — M Elamin
(74) *Attorney, Agent, or Firm* — Brandon C. Kennedy; Katherine S. Brown; Biggers Kennedy Lenart Spraggins LLP

(57) ABSTRACT

Methods, computers, and products for managing power consumption of a computer, the computer including a computer processor and managing power consumption of a computer includes: dynamically during operation of the computer, setting, by an in-band power manager in dependence upon performance metrics of the computer processor, a current performance state ('p-state') of the computer processor; and providing, by the in-band power manager to an out-of-band power manager, the current p-state of the computer processor.

12 Claims, 2 Drawing Sheets

MANAGING POWER CONSUMPTION OF A COMPUTER

CROSS-REFERENCE TO RELATED APPLICATION

This application is a continuation application of and claims priority from U.S. patent application Ser. No. 12/146,056, filed on Jun. 25, 2008 now U.S. Pat. No. 8,307,220.

BACKGROUND OF THE INVENTION

1. Field of the Invention

The field of the invention is data processing, or, more specifically, methods, computers, and products for power management in a computer.

2. Description of Related Art

The development of the EDVAC computer of 1948 is often cited as the beginning of the computer era. Since that time, computers have evolved into extremely complicated devices. Today's computers are much more sophisticated than early systems such as the EDVAC. Computers typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computers today that are much more powerful than just a few years ago.

Computer systems today may consume a large amount of power and generate a large amount of heat. To control power consumption and heat generation of computers, operating system ('OS') and computer processor designers have implemented power management techniques that are carried out by the OS, like the Advanced Configuration and Power Interface ('ACPI') modules of most modern operating systems. Such OS-based power management techniques, manage power consumption of a computer in dependence upon the performance of the computer processor. Other power management techniques have been implemented in computers in software not executing as part of the OS. In fact, such non-OS-based power management techniques are typically implemented in software executing on a processor, such as a service processor, that is not the computer's primary processor. Such non-OS-based power management techniques manage power consumption of a computer processor only in dependence measured temperature, current, power values, and the like, not in dependence upon the performance of the computer processor. While both the OS-based and non-OS-based may manage power consumption in a computer concurrently, there is currently no cooperation between OS-based power management and non-OS-based power management techniques. As such, OS-based and non-OS-based power management techniques often conflict in managing power consumption of the computer system.

SUMMARY OF THE INVENTION

Methods, computers, and products for managing power consumption of a computer, the computer including a computer processor and managing power consumption of a computer includes: dynamically during operation of the computer, setting, by an in-band power manager in dependence upon performance metrics of the computer processor, a current performance state ('p-state') of the computer processor; and providing, by the in-band power manager to an out-of-band power manager, the current p-state of the computer processor.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
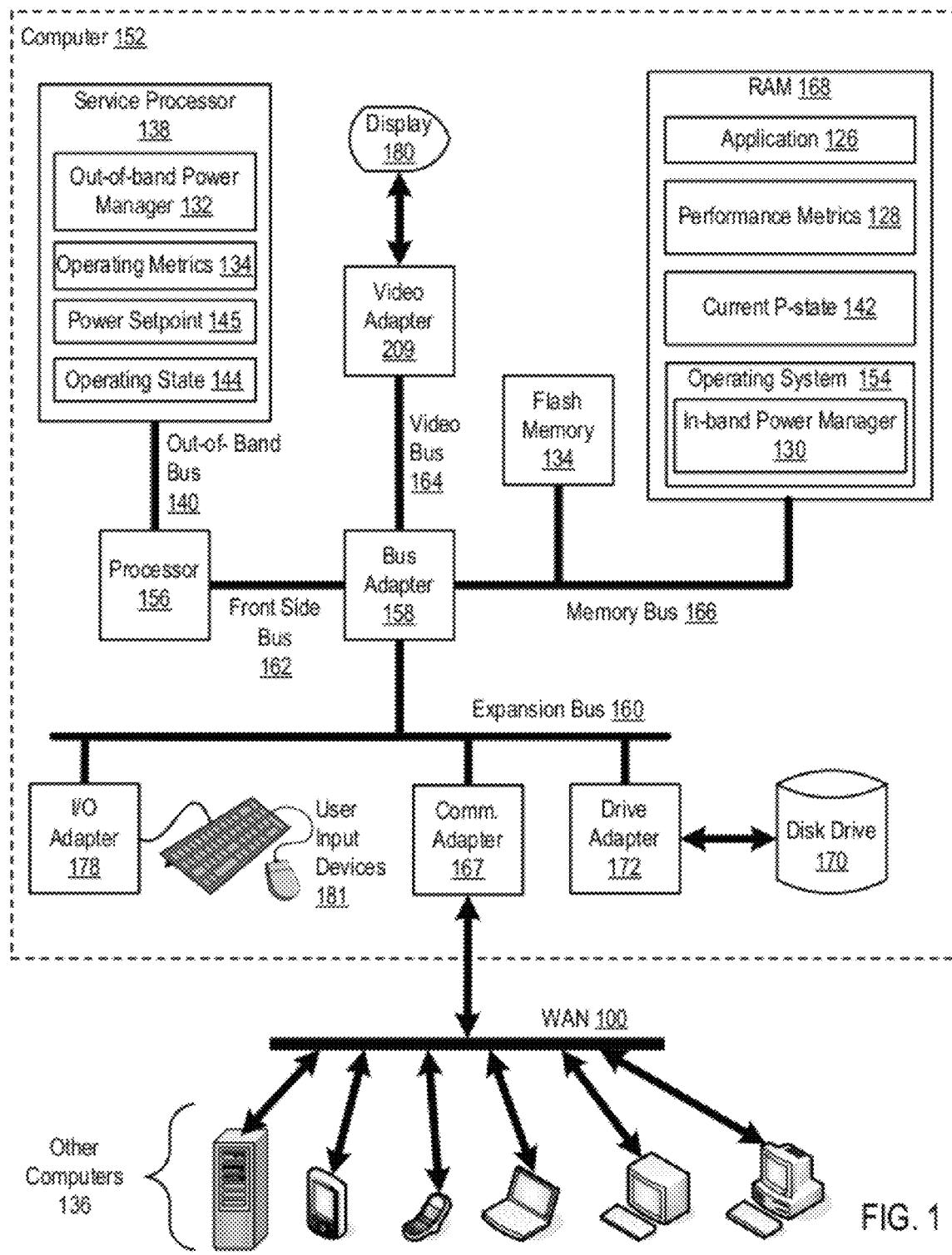
FIG. 1 sets forth a functional block diagram of an exemplary system that includes a computer for which power consumption is managed according to embodiments of the present invention.

Exemplary methods, computers, and products for power management in a computer in accordance with the present invention are described with reference to the accompanying drawings, beginning with FIG. 1. FIG. 1 sets forth a functional block diagram of an exemplary system that includes a computer (152) for which power consumption is managed according to embodiments of the present invention.

The computer (152) comprises automated computing machinery for which power consumption is managed in accordance with embodiments of the present invention. An example of such automated computing machinery for which power consumption may be managed according to embodiments of the present invention is a blade server. A server, as the term is used in this specification, refers generally to a multi-user computer that provides a service (e.g. database access, file transfer, remote access) or resources (e.g. file space) over a network connection. The term 'server,' as context requires, refers inclusively to the server's computer hardware as well as any server application software or operating system software running on the server. A server application is an application program that accepts connections in order to service requests from users by sending back responses. A server application can run on the same computer as the client application using it, or a server application can accept connections through a computer network. Examples of server applications include file server, database server, backup server, print server, mail server, web server, FTP servers, application servers, VPN servers, DHCP servers, DNS servers, WINS servers, logon servers, security servers, domain controllers, backup domain controllers, proxy servers, firewalls, and so on.

Blade servers are self-contained servers, designed for high density. A blade enclosure provides services such as power, cooling, networking, various interconnects and management—though different blade providers have differing principles around what should and should not be included in the blade itself—and sometimes in the enclosure altogether. Together, a set of blade servers installed in a blade enclosure or 'blade center' for a blade system. As a practical matter, all computers are implemented with electrical components requiring power that produces heat. Components such as processors, memory, hard drives, power supplies, storage and network connections, keyboards, video components, a mouse, and so on, merely support the basic computing function, yet they all add bulk, heat, complexity, and moving parts that are more prone to failure than solid-state components. In the blade paradigm, most of these functions are removed from the blade computer, being either provided by the blade enclosure (DC power) virtualized (iSCSI storage, remote console over IP), or discarded entirely (serial ports). The blade itself becomes simpler, smaller, and amenable to dense installation with many blade servers in a single blade enclosure.

The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152). Stored in RAM (168) is an application (126), a set of computer program instructions for user-level data processing. Examples of such software applications include server applications, word processors, spreadsheet applications, media players, and so on as will occur to those of skill in the art.

Also stored in RAM (168) is an operating system (154). Operating systems useful for managing power consumption of a computer according to embodiments of the present invention include UNIX™, Linux™, Microsoft XP™, Microsoft Vista™, AIX™, IBM's i5/OS™, and others as will occur to those of skill in the art. The operating system (154) in the example of FIG. 1 includes an in-band power manager (130). An in-band power manager (130) is a set of computer program instructions that manages power consumption of the computer (152) in accordance with embodiments of the present invention by dynamically during operation of the computer (152), setting, in dependence upon performance metrics of the computer processor (156), a current performance state ('p-state') of the computer processor and providing, by the in-band power manager (130) to an out-of-band power manager (132), the current e-state of the computer processor.

Performance metrics (128) of a computer processor (156) are information that describes actual performance of the computer processor. Examples of performance metrics (128) include a measure of computer processor utilization, values of hardware performance counters, and so on as will occur to those of skill in the art. Hardware performance counters, also called hardware counters, are a set of special-purpose registers implemented in many microprocessors to store counts of hardware-related activities within a computer. Examples of counts of hardware-related activities stored in the hardware performance counters include data cache misses, instruction cache, misses, cycles stalled waiting for memory access, cycles with no instruction issued, cycles with maximum instruction issued, and so on as will occur to those of skill in the art.

A performance state ('p-state') defines an operational state of a computer processor by specifying a core voltage level for the computer processor and a clock speed of the computer processor. A core voltage of a computer processor is the voltage level of the voltage regulator of the computer processor. P-states may be organized into a number of different levels where lower level p-states generally represent greater performance by a processor, higher core voltage levels, and higher clock speeds, and higher level p-states generally represent lower performance by a processor, lower core voltage levels, and lower clock speeds. The power of a computer processor is proportional to the clock speed and core voltage of the processor. The core voltage of a computer processor then is affected then by variations in clock speed. Readers of skill in the art will immediately that core voltage and clock speed are variable and lowering either value reduces power consumption of the computer processor. When a computer processor is under a low load, as indicated by the performance metrics (128) of the computer processor, the in-band power manager (130) may set the current p-state of the computer processor to a higher p-state, thereby reducing power consumption by the computer processor with very little, if any, reduction in performance by the computer processor. Examples of technologies that vary p-states of a computer processor include Intel's SpeedStep™ technologies, AMD's PowerNow!™ and Cool'n'Quiet™ technologies, VIA's LongHaul™ technologies, and the like. Readers of skill in the art will recognize that each of these technologies may be improved to be useful for managing power consumption of a computer according to embodiments of the present invention.

In the example of FIG. 1, the in-band power manager is depicted as a software component of an operating system (154) for ease of explanation. Readers of skill in the art will recognize, however, that an in-band power manager may alternatively be implemented as a component of an Advanced Configuration and Power Interface ('ACPI') module of an operating system or as a standalone software application separate from the operating system. The operating system (154), in-band power manager (130), and other software modules, in the example of FIG. 1, are shown in RAM (168), but many components of such software typically are stored in non-volatile memory also, such as, for example, on a disk drive (170) or in flash memory (134).

The computer (152) of FIG. 1 also includes a service processor (138) executing an out-of-band power manager. In the computer (152) of FIG. 1, the service processor (138) is connected to the processor (156) through an out-of-band bus (140). Such an out-of-band bus (140) may be implemented as a Low Pin Count ('LPC') bus, an Inter-Integrated Circuit ('I²C') bus, a System Management Bus ('SMBus'), a Serial Peripheral Interface ('SPI') Bus, and so on as will occur to those of skill in the art.

As mentioned above, once the in-band power manager (130) sets the current p-state (142) of the computer processor (156), the in-band power manager (130) provides the current p-state (142) to an out-of-band power manager (132). That is, according to embodiments of the present invention, the out-of-band and in-band power managers cooperate in managing power consumption of the computer (152). The in-band power manager (138) may provide the current p-state (142) by raising an interrupt upon a write by the computer processor to an address used for setting the current p-state of the computer processor, and executing an interrupt routine that identifies the current p-state and transmits the current p-state to the out-of-band power manager (132) on the out-of-band-bus (140).

A service processor (138) is a specialized microcontroller which may be embedded on the motherboard of a computer. Different types of sensors built into a computer report to the service processor on metrics such as temperature, cooling fan speeds, operating system status, and so on. The service processor (138) may monitor the sensors and send alerts to a system administrator via a network if any of the monitored metrics exceed predefined limits, indicating a potential failure of the computer. An administrator may also remotely communicate with a service processor to take corrective action such as resetting or power cycling the computer to get a stalled operating system executing properly.

One example of a service processor is a baseboard management controller ('BMC') used in many blade servers. The BMC's basic functions are defined by the Intelligent Platform Management Interface ('IPMI') architecture. The BMC may manage an interface between system management software and platform hardware. Physical interfaces to a BMC may include SMBus busses, an RS-232 serial console, address and data lines, and an Intelligent Platform Management Bus ('IPMB') that enables the BMC to accept IPMI request messages from other management controllers in the system.

In the example of FIG. 1, the service processor (138) includes computer memory, such as RAM or flash memory, capable of storing an out-of-band power manager (132), a set of computer program instructions that manages power consumption of the computer according to embodiments of the present invention by calculating, in dependence upon currently-measured operating metrics (134) of the computer processor (156), a power setpoint for the computer processor, and the current p-state (142), an operating state (144) for the computer processor.

Currently-measured operating metrics (134) of the computer processor (156) are measurements of parameters of an operating computer processor. Examples of currently-measured operating metrics (134) of the computer processor (156) include a computer processor's current draw, power usage, case temperature, and so on as will occur to those of skill in the art.

A setpoint is a target value that an out-of-band power manager attempts to achieve through control of the computer processor. A power setpoint is a data structure that defines one or more preferred operating points for a particular operating state (144) of a computer processor. The out-of-band power manager uses the power setpoint to control power consumption, case temperature, and other operating metrics of the computer processor during operation of the processor.

An operating state (144) of a computer processor may be defined by one or more operating parameters of a computer processor, such as core voltage and clock speed of the processor. The out-of-band power manager attempts to achieve the power setpoint by varying the operating state (144) of the computer processor throughout operation of the computer processor. 'Achieving' a power setpoint as used here means that a currently-measured operating metric of the same type as a preferred operating metric of the power setpoint is approximately equal to that preferred operating metric as defined in the power setpoint. Consider, for example, a power setpoint that defines a preferred operating metric for power consumption of computer processor at 10 watts. If the currently-measured operating metric for the power consumption of the computer processor is 10.0001 watts, the currently-measured operating metric is approximately equal to the preferred operating metric defined in the power setpoint and the preferred operating metric for the power setpoint is 'achieved.'

The out-of-band power manager (132) may vary the power setpoint (145) dynamically during operation of the computer processor to achieve an optimum combination of power savings, case temperature, and computer processor performance. The out-of-band manger (132) may vary the power setpoint (145) by calculating and setting a value for any of the preferred operating points or any operating parameters of the computer processor. In many embodiments the preferred operating points never vary but the operating parameters of the computer processor are continually varied to achieve the preferred operating points.

Unlike out-of-band power managers that calculate an operating state (144) for a computer processor according to embodiments of the present invention, out-of-band power managers in prior art calculate an operating state only in dependence upon a power setpoint and currently-measured operating metrics of the computer processor, not in dependence upon the current p-state of the computer processor. As such, out-of-band power managers of the prior art calculated operating states in complete ignorance of performance metrics of the computer processor because, as mentioned above, a p-state is set in dependence upon such performance metrics. In contrast to those prior art power managers, an out-of-band power manger (132) according to embodiments of present invention may calculate an operating state (144) in dependence upon the currently-measured operating metrics of a computer processor as well as performance metrics of the computer processor through the current p-state of the computer processor.

Consider, for further explanation, an example power setpoint that defines a preferred operating point of 50 watts of power consumption by the computer processor and a current operating state of a computer processor at 768 megahertz clock speed. Consider also that the only operating metric used by the out-of-band power manager to calculate the operating state is the power consumption of the processor, which is currently measured at 10 watts. An out-of-band power manager of the prior art may calculate a new operating state only in dependence upon the currently-measured operating parameter of 10 watts and the power setpoint, such that the calculated operating state defines a new clock speed of 1.2 gigahertz. Consider also that the low power consumption of the computer processor, 10 watts, is caused by a high p-state, a low core voltage level for example, set by an in-band power manager in dependence upon performance metrics of a computer processor that indicate that the processor is under a low load or is idle. In such an example, increasing the clock speed of the computer processor by the prior art out-of-band power manager only increases power consumption with relatively little, if any, increase in performance of the computer processor due to the processor's currently low load.

An out-of-band power manager (132) according to embodiments of the present invention, in contrast, may calculate an operating state (144) in dependence upon the current p-state as well as the 10 watt power consumption of the computer processor, and the power setpoint. In such an example, the out-of-band power manager (132) according to embodiments of the present invention may calculate an operating state functionally equivalent to a previously calculated operating state or may decrease the clock speed. That is, the out-of-band power manger may not change the clock speed of the computer processor at all or may decrease the clock speed, because any increase in the processor's clock speed will result in increased power consumption with little, if any, increase in performance of the computer processor.

The computer (152) of FIG. 1 also includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers in which power consumption is managed according to embodiments of the present invention include Integrated Drive Electronics ('IDE') adapters, Small Computer System Interface ('SCSI') adapters, and others as will occur to those of skill in the art. Non-volatile computer memory also may be implemented as an optical disk drive, electrically erasable programmable read-only memory (so-called 'EEPROM' or 'Flash' memory) (134), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with a data communications network (100) and other computers (136). Such data communications may be carried out serially through RS-232 connections, through external buses such as a Universal Serial Bus (USW), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful in computers for which power consumption is managed according to embodiments of the present invention include modems for wired dial-up communications, Ethernet (IEEE 802.3) adapters for wired data communications network communications, and 802.11 adapters for wireless data communications network communications.

The arrangement of computers, servers, networks, and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
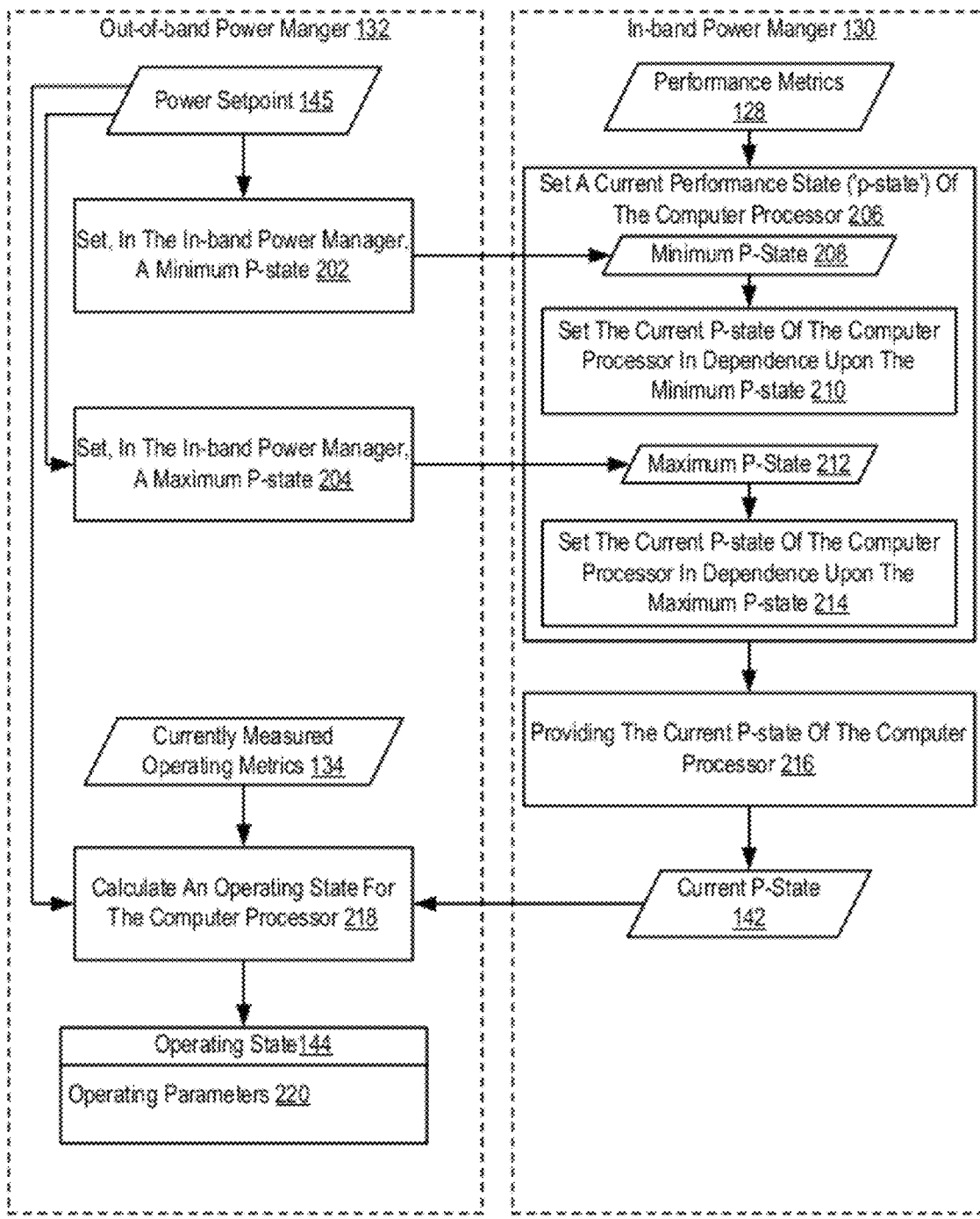
FIG. 2 sets forth a flow chart illustrating an exemplary method for managing power consumption of a computer according to embodiments of the present invention.

For further explanation, FIG. 2 sets forth a flow chart illustrating an exemplary method for managing power consumption of a computer according to embodiments of the present invention. In the method of FIG. 2, the computer (152 on FIG. 1) for which power consumption is managed includes a computer processor (156 on FIG. 1).

The method of FIG. 2 also includes setting (202), by the out-of-band power manager (132), in the in-band power manager (130), a minimum p-state (208) and setting (204), by the out-of-band power manager (132), in the in-band power manager (130), a maximum p-state (212). Setting a maximum or minimum p-state may be carried out by raising a system control interrupt that invokes an in-band interrupt handler and transmitting on the out-of-band bus (140 on FIG. 1) the maximum or minimum p-state. The in-band interrupt handler may be configured to receive the maximum or minimum p-state on the out-of-band bus and write that p-state to a register designated for storing the maximum or minimum p-state.

Setting (202), by the out-of-band power manager (132), in the in-band power manager (130), a minimum p-state (208) and setting (204), by the out-of-band power manager (132), in the in-band power manager (130), a maximum p-state (212) may be carried out in dependence upon the power setpoint (145). That is, a power setpoint (145) may explicitly specify a maximum and minimum p-state, or may be used to determine a maximum and minimum p-state.

After the minimum and maximum p-state are set by the out-of-band power manager, the method of FIG. 2 continues by setting (206), dynamically during operation of the computer, by an in-band power manager (130) in dependence upon performance metrics (128) of the computer processor, a current performance state ('p-state') of the computer processor. Setting (206) a current performance state ('p-state') of the computer processor may be carried out by setting, by the in-band power manager (130), a core voltage level for the computer processor and a clock speed of the computer processor by storing values representing such a core voltage level and clock speed in computer memory designated for such a purpose, such as a register of the computer processor.

In the method of FIG. 2, setting (206) a current p-state (142) of the computer processor may include setting (210) the current p-state (142) of the computer processor in dependence upon the minimum p-state (208) and setting (214) the current p-state (142) of the computer processor in dependence upon the maximum p-state (212).

Because operating a computer processor in lower p-states typically results in greater performance and increased power consumption by a computer processor, setting a minimum p-state for the in-band power manager effectively caps the maximum power consumption of the computer processor. Setting a minimum p-state may be useful, for example, in a backup blade server that provides backup services for another primary blade server when the primary blade server fails. Such a backup blade server may only intermittently execute software applications and then only for short periods of time during which the primary blade server is repaired or replaced. In such an example backup blade server, high performance of the computer processor is not required and power consumption may be reduced with little or not detriment to the overall performance of the backup blade server.

Because operating a computer processor in higher p-states typically results in lower performance and decreased power consumption by a computer processor, setting a maximum p-state for the in-band power manager effectively ensures a lowest performance level of the computer processor when under a load. Setting a maximum p-state may be useful for example, in a blade server executing a highly critical application for which greater computer processor performance is required.

The method of FIG. 2 also includes providing (216), by the in-band power manager (130) to an out-of-band power manager (132), the current p-state (142) of the computer processor. As mentioned above, providing (216), by the in-band power manager (130) to an out-of-band power manager (132), the current p-state (142) of the computer processor may be carried out by raising an interrupt upon a write by the computer processor to an address used for setting the current p-state of the computer processor, and executing an interrupt routine that identifies the current p-state and transmits the current p-state to the out-of-band power manager (132) on the out-of-band-bus (140 on FIG. 1). Such an interrupt may, for example, be implemented as a system management interrupt ('SMI') trap used to detect access of a particular memory location.

The method of FIG. 2 also includes calculating (218), by the out-of-band power manager (132), in dependence upon currently-measured operating metrics (134) of the computer processor, the current p-state (142), and a power setpoint (145) for the computer processor, an operating state (144) of the computer processor. Calculating (218) an operating state (144) for the computer processor may be carried out in various ways including, for example, by finding in a look-up table that associates operating states with combinations of operating metrics, p-states, and power setpoints, an operating state for the combination of the currently-measured operating metrics, current p-state, and setpoint. Calculating (218) an operating state (144) for the computer processor may also be carried out through a voting algorithm that uses each currently-measured operating metric, the current p-state, and the power setpoint to determine whether to vary the current operating parameters (220), such as clock speed and core voltage, of the computer processor and the amount by which to vary the operating parameters to achieve the predefined preferred operating points of a previously calculated operating state. In such a voting algorithm, each currently-measured operating metric and the current p-state may be assigned a predefined weight, such that different preferred operating points are of different levels importance to achieve. Although only two example ways of calculating (218) an operating state (144) are described here, readers of skill in the art will recognize that there may be many other ways of calculating an operating state in dependence upon currently-measured operating metrics, the current p-state, and a power setpoint, and each such way is well within the scope of the present invention.

Exemplary embodiments of the present invention are described largely in the context of a fully functional computer for managing power consumption of a computer. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of managing power consumption of a computer, the computer comprising a computer processor, the method comprising:
  dynamically during operation of the computer, setting, by an in-band power manager in dependence upon performance metrics of the computer processor, a current performance state ('p-state') of the computer processor; and
  providing, by the in-band power manager to an out-of-band power manager, the current p-state of the computer processor;
  wherein:
  the method further comprises setting, by the out-of-band power manager, in the in-band power manager, a minimum p-state; and
  setting, by the in-band power manager, a current p-state of the computer processor further comprises setting the current p-state of the computer processor in dependence upon the minimum p-state.

2. The method of claim 1 further comprising:
  calculating, by the out-of-band power manager, in dependence upon currently-measured operating metrics of the computer processor, a power setpoint for the computer processor, and the current p-state, an operating state for the computer processor.

3. The method of claim 1 wherein:
  the method further comprises setting, by the out-of-band power manager, in the in-band power manager, a maximum p-state; and
  setting, by the in-band power manager, a current p-state of the computer processor further comprises setting the current p-state of the computer processor in dependence upon the maximum p-state.

4. The method of claim 1 wherein setting, by the in-band power manager, a current p-state of the computer processor further comprises setting a core voltage level for the computer processor and a clock speed of the computer processor.

5. A computer for which power consumption is managed, the computer comprising a computer processor and a service processor, computer memory operatively coupled to the computer processor and the service processor, the computer memory having disposed within it computer program instructions capable of:
  dynamically during operation of the computer, setting, by an in-band power manager in dependence upon performance metrics of the computer processor, a current performance state ('p-state') of the computer processor; and
  providing, by the in-band power manager to an out-of-band power manager, the current p-state of the computer processor;
  wherein:
  the computer program instructions are further capable of setting, by the out-of-band power manager, in the in-band power manager, a maximum p-state; and
  setting, by the in-band power manager, a current p-state of the computer processor further comprises setting the current p-state of the computer processor in dependence upon the maximum p-state.

6. The computer of claim 5 further comprising computer program instructions capable of:
  calculating, by the out-of-band power manager, in dependence upon currently-measured operating metrics of the computer processor, a power setpoint for the computer processor, and the current p-state, an operating state for the computer processor.

7. The computer of claim 5 wherein:
  the computer program instructions are further capable of setting, by the out-of-band power manager, in the in-band power manager, a minimum p-state; and
  setting, by the in-band power manager, a current p-state of the computer processor further comprises setting the current p-state of the computer processor in dependence upon the minimum p-state.

8. The computer of claim 5 wherein setting, by the in-band power manager, a current p-state of the computer processor further comprises setting a core voltage level for the computer processor and a clock speed of the computer processor.

9. A computer program product for managing power consumption of a computer, the computer comprising a computer processor, the computer program product disposed in a non-transitory computer readable medium, the computer program product comprising computer program instructions capable of:

dynamically during operation of the computer, setting, by an in-band power manager in dependence upon performance metrics of the computer processor, a current performance state ('p-state') of the computer processor; and providing, by the in-band power manager to an out-of-band power manager, the current p-state of the computer processor;

wherein:

the computer program instructions are further capable of setting, by the out-of-band power manager, in the in-band power manager, a minimum p-state; and setting, by the in-band power manager, a current p-state of the computer processor further comprises setting the current p-state of the computer processor in dependence upon the minimum p-state.

10. The computer program product of claim 9 further comprising computer program instructions capable of:

calculating, by the out-of-band power manager, in dependence upon currently-measured operating metrics of the computer processor, a power setpoint for the computer processor, and the current p-state, an operating state for the computer processor.

11. The computer program product of claim 9 wherein:

the computer program instructions are further capable of setting, by the out-of-band power manager, in the in-band power manager, a maximum p-state; and setting, by the in-band power manager, a current p-state of the computer processor further comprises setting the current p-state of the computer processor in dependence upon the maximum p-state.

12. The computer program product of claim 9 wherein setting, by the in-band power manager, a current p-state of the computer processor further comprises setting a core voltage level for the computer processor and a clock speed of the computer processor.

* * * * *